United States Patent

[11] 3,623,940

| [72] | Inventors | Harold M. Gladstone<br>Millington;<br>Leonard D. Loan, Murray Hill, both of N.J. |
|---|---|---|
| [21] | Appl. No. | 833,473 |
| [22] | Filed | June 16, 1969 |
| [45] | Patented | Nov. 30, 1971 |
| [73] | Assignee | Bell Telephone Laboratories, Incorporated<br>Murray Hill, N.J. |

[54] INSULATED WIRE AND MANUFACTURE THEREOF
2 Claims, 2 Drawing Figs.

[52] U.S. Cl. ............................................. 161/175,
117/93.31, 117/128.4, 117/232, 161/412, 174/110
V, 264/22, 264/174
[51] Int. Cl. ............................................. H01b 7/00
[50] Field of Search ............................................. 161/175,
216, 218, 412; 117/93.31, 128.4, 232; 204/159.17,
159.20; 174/110; 260/89.5, 884; 264/22, 174

[56] References Cited
UNITED STATES PATENTS

| 3,141,850 | 7/1964 | Lybeck | 260/884 |
|---|---|---|---|
| 3,247,289 | 4/1966 | Sears | 260/884 |
| 3,259,688 | 7/1966 | Towne et al. | 161/175 |
| 3,359,193 | 12/1967 | Pinner | 204/159.17 |
| 3,515,589 | 6/1970 | Izumi et al. | 117/128.4 |

*Primary Examiner*—Robert F. Burnett
*Assistant Examiner*—Linda Koeckert
*Attorneys*—R. J. Guenther and Edwin B. Cave

ABSTRACT: Abrasion-resistant, fire-retardant conductive wire utilizes a single insulating layer of irradiation cross-linked PVC. Cross-linking is brought about by means of a difunctional monomer. Plasticizers necessary in ordinary cross-linked PVC may be eliminated in certain compositions.

PATENTED NOV 30 1971

3,623,940

INVENTORS H. M. GLADSTONE
L. D. LOAN
BY
George S. Indig
ATTORNEY

INSULATED WIRE AND MANUFACTURE THEREOF

BACKGROUND OF THE INVENTION

1. Field of the Invention

The invention is concerned with conductive wire insulated with abrasion-resistant, fire-retardant material. These properties are specified for switchboard wiring and other indoor use particularly where installation or removal may involve pulling past other wires or mechanical members.

2. Description of the Prior Art

An insulated wire configuration presently in widespread use in the communications industry includes three successive layers: (1) a primary insulation of polyvinyl chloride—a suitable fire-retardant thermoplastic material, (2) a textile layer for abrasion resistance and to prevent excessive PVC flow at high temperature as during soldering, and (3) a fire-retardant lacquer layer to compensate for the flammability of the textile and also to improve abrasion resistance. This structure is used as switchboard wire where abrasion resistance is necessitated by installation or removal by drawing through troughs, and also in sheathed cable, where abrasion resistance is of lesser importance but where heat resistance and fire-retardant properties continue to be significant.

For some years, studies have been underway to replace the three-layer structure with a single-layer structure. To date, such studies have been generally unrewarding. Single-layer structures with suitable properties for demanding uses now served by the composite structure have not emerged.

SUMMARY OF THE INVENTION

In accordance with the invention, there is described a conducting wire covered with but a single layer of insulating material which manifests sufficiently high abrasion resistance, fire retardance, heat resistance and processability to be considered as a replacement for the three-layer structure now in use.

The insulation on this new structure is an irradiation cross-linked PVC composition in which cross-linking is accomplished by means of a monomer or mixture of monomers including a class of materials typified by TEGDM (tetraethylene glycol dimethacrylate). While various conventional additives may be included in the composition, under certain circumstances it is unnecessary to include a plasticizer. Since elimination of this ingredient results in still further improvement in coating characteristics, a preferred embodiment is so described.

Fabrication of the wire structure is carried out in two stages. In stage one, the gelled mixture of uncross-linked PVC together with cross-linking monomer/s and any other additives such as stabilizer, added fire retardant, lubricant, pigment, etc., is extruded over the wire; and, in stage two, the PVC is irradiation cross-linked. Processing conditions are described under "Detailed Description."

DETAILED DESCRIPTION

1. Composition

Figure 1:
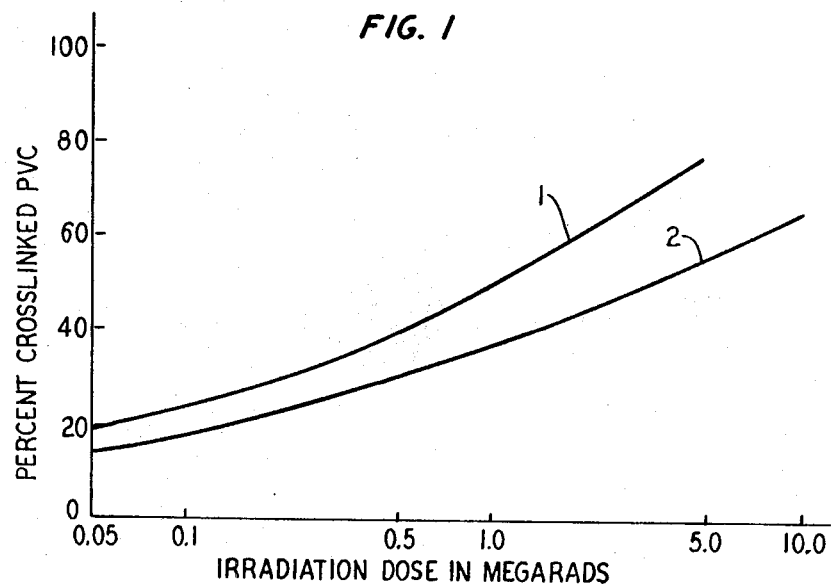
FIG. 1, on coordinates of percent of cross-linked PVC and irradiation dose in megarads, is a plot showing the relationship between those two parameters for exemplary unplasticized and plasticized compositions.

A. Conductor—The material of which the conductor is constructed is not critical. Commonly used conductors are copper and aluminum as well as alloys of either of these materials. It is common practice to tin conductors to aid in making solder joints and no complications are introduced by this conventional procedure.

B. Polymer—The basic polymer which is utilized in the invention compositions is polyvinyl chloride (PVC). Maximum abrasion resistance and also heat resistance result from use of the homopolymer. However, commercial PVC polymers which may contain up to 20 percent of preferably to a maximum of 10 percent by weight of comonomers or other admixed material such as propylene, may be utilized without significant adverse effect. The PVC compound may be of any composition suitable for use as electrical insulation. In accordance with the A.S.T.M. standard for 1966 suitable compounds may be classified as within the range of from GP4—00003 to GP7—00003 inclusive. Definition of these classifications are set forth in the A.S.T.M. standard under designation D1755–66. Very briefly, the designation, GP, designates a general purpose resin. The first numerals (entries 4 through 7) represent a polymer molecular weight in terms of solution viscosity and the last digit, 3, indicates the usual preference for an electrical conductivity less than 6 ohms per cm. per gram. This electrical characteristic is, of course, not a basic requirement from the standpoint of the inventive teaching. The four ciphers in the designations indicate that the properties of particle size, apparent bulk density, plasticizer absorption and dry flow may be any A.S.T.M. designated level, i.e., 1–9, and, therefore, that these properties are not critical for the inventive purposes.

C. Cross-linking Medium—The cross-linking medium necessarily contains a difunctional monomer of the type $CH_2C(CH_3)COO(CH_2)_xOCOC(CH_3)CH_2$ or $CH_2C(CH_3)COO(CH_2CH_2O)_y COC(CH_3)CH_2$ in which $x$ is an average value of from 3 to 40 and $y$ is an average value of from 1.5 to 20. It is essential to the invention that at least 50 percent by weight and, preferably, at least 75 percent by weight of the cross-linking medium be made up of such monomer. The maximum limits in value of $x$ or $y$ (the two limits are equivalent since they specify the same number of carbon atoms) cannot be significantly exceeded since this results in a noticeable loss in abrasion resistance. The minimum limits in $x$ and $y$ are perhaps the greater consequence particularly in accordance with the preferred embodiment which avoids the use of a plasticizer. It is a significant aspect of this invention that a cross-linking monomer itself serves the function of plasticizing the compound sufficiently to permit expedient processing. While a fair degree of the plasticizer action is lost during irradiation, there is sufficient retention to impart the required flexibility for most wire and cable uses. This minimum limit in $x$ or $y$ is of consequence also where plasticizer is included since the amount of plasticizer required is reduced for the included class of cross-linking monomers. Elimination or minimization of plasticizer may be beneficial in several ways. Addition of increasing amounts of such ingredient dilutes otherwise excellent polymer properties and results in reduction of abrasion resistance, of fire retardance and of heat resistance. Other difficulties associated particularly with monomeric plasticizers which may be avoided include lacquer-lifting, bleeding, temperature instability (particularly on aging), etc.

While the class of cross-linking monomers described above is essential to the invention, it is nevertheless permissible, as has been indicated, to admix up to 50 percent by weight or preferably a lesser amount of up to 25 percent by weight of a different cross-linking agent or agents. Example of such additives include butyl methacrylate which may impart greater flexibility (and when included in amount of at least 25 percent by weight of total cross-linking medium may permit halving the $x$ and $y$ minima above). Admixed cross-linking efficiency. Triallyl phosphate being a trifunctional rather than a difunctional monomer is exemplary of this class.

It is convenient to discuss concentrations in terms of parts by weight based on 100 parts of polymer. Concentrations so designated, therefore, result in compositions having greater than 100 parts. The total amount of cross-linking monomer/s is within the range of from 10 to 50 parts. The minimum is required for sufficient cross-linking to produce the abrasion resistance and other properties which have been described, while exceeding the upper limit reduces fire retardance unduly.

D. Plasticizer—A minimum of 25 parts is preferred to facilitate processing particularly where little or no plasticizer is included. While, as indicated, the preferred compositions herein include no plasticizer whatever, in instances in which such additive is indicated, it may be added in amounts of up to about 20 parts. Exceeding this amount, again, has a deleterious effect not only on those very properties which are enhanced by cross-linking, i.e., abrasion resistance and heat resistance, but also on the excellent properties of PVC itself, i.e., fire retardance. Examples of suitable plasticizers are monomeric materials such as dioctyl phthalate and tricresyl phosphate, and polymeric materials such as polyethylene sebacate and polypropylene adipate. While it is a teaching of this invention that any given amount of plasticizer results in greater flexibility because of the cross-linking medium, selection of plasticizer or plasticizer mixture is based on the same considerations as apply to the thermoplastic polymer.

E. Stabilizer—These include PVC stabilizers of the usual type designed to prevent HCl evolution. Examples of such materials are basic lead salts such as tribasic lead sulfate and dibasic lead phthalate.

Since irradiation may otherwise result in some PVC degradation, the recommended amount of stabilizer is somewhat greater than that incorporated in the uncross-linked thermoplastic material. It has been found that stabilizer is usefully included within the range of from about 5 to about 10 parts on the stated basis. Significantly less than 5 parts results in noticeable deterioration during irradiation particularly for larger radiation dosage, while exceeding the maximum appears to impart little increased stability.

F. Filler—Fillers such as calcium carbonate and silica may be included in amounts of up to 30 parts on the basis described to (1) stiffen the product particularly where plasticizer is included and/or (2) to reduce cost.

G. Fire retardant—While in large part, the commercial significance of the inventive product is due to its inherent fire retardance, extremely demanding use may indicate inclusion of an additional retardant. The usual materials, of which by far the most common is antimony oxide, may be included in up to 3 parts by weight for this purpose. Exceeding this upper limit is of little further benefit.

H. Lubricant Wax or other lubricant may be added in amount of up to 2 parts by weight generally to serve as a processing aid. For certain applications, there may be further advantage in that use of such additive tends also to reduce adhesion between the insulation and the conductor.

I. Colorant—Another standard ingredient for many other purposes is colorant added for identification purposes. Colorants may be organic or inorganic and may be included in amounts of up to about 1 part by weight. It is well known that certain colorants are to be preferred for certain purposes enumeration of which is not appropriate to this description. Additionally, since the colorant and, for that matter, all other ingredients are present during irradiation, they should not be of such nature as to be deleteriously affected or to interfere with this procedural step.

2. Processing

The following outline is exemplary only. Processing conditions are conventional, of course, with the exception of the irradiation step. Initial mixing may be by dry blending of the initial mix: (1) resin (2) cross-linking medium (3) plasticizer if any (4) filler (also optional) (5) stabilizer and (6) lubricant. Most expediently the dry blend is gelled ("melted") and diced but it is also permissible to feed the dry blend directly into the extruder.

Following blending, the compound is extruded, again, in a conventional manner. Some of the experiments were conducted with a 2½inch extruder and crosshead. Using 22 gauge wire and an 8-mil-thick coating, extrusion rates of about 2,500 feet per minute were easily achieved at a temperature of about 290° F. at the extrusion head. Usual coating thickness for communication purposes is up to about 15 mil wall thickness.

The effect of irradiation may be seen from FIG. 1. The data of both curves 1 and 2 were carried out with samples of the same approximate composition. Curve 1 was plotted for such sample containing no plasticizer while curve 2 corresponds with a sample containing twenty parts of dioctyl phthalate.

The recommended radiation dose for these purposes is from 0.01 to 10 megarads. The various characteristics enhanced by cross-linking may be described, at least in part, in terms of the percent of polymer which is cross-linked, that is the weight percent of polyvinyl chloride rendered insoluble by the radiation treatment. It is seen that the recommended dose corresponds with a cross-link percentage on this basis of approximately 20 percent to something in excess of 60 percent depending on plasticizer content. Less radiation results in inadequate cross-linking to bring about a significant improvement either in abrasion resistance or heat resistance as compared with the thermoplastic material, while exceeding the upper limit leads to no further significant increase in these properties. It is apparent from FIG. 1 that cross-linking is more effectively carried out in the absence of plasticizer, and, for this reason, a preferred maximum dosage where no plasticizer is present is about 5 megarads. For many purposes, a plasticized material may be sufficiently cross-linked for even the most demanding installations with a dose of only about 1 megarad. Of course, the effectiveness of the irradiation depends also on the nature of the cross-linking media and, as noted, efficiency may be increased by inclusion of a trifunctional monomer. In general, however, the maximum indicated dosage is not critical and may be exceeded. While further increase in dosage may result in increasing abrasion resistance and increasing heat resistance, these properties may be accompanied by an increase in stiffness. Accordingly, optimum dosage for any intended use depends on the nature of the properties desired.

In the above description, the term megarad is used in its conventional sense, i.e., one-tenth of the energy absorbed in the sample in joules per gram. Since essentially all of the radiation is absorbed in the usual wire configuration at the generally used energy levels, this standardized nomenclature very nearly indicated the precise amount of energy taken up by the polymer.

Appropriate irradiation energies are known. For these purposes, particle energies should substantially exceed 100 Kev. and should preferably attain a level of 300 Kev. for 8 mil insulation. Suitable sources are electron beams such as may be produced by Van der Graaf accelerators, or gamma radiation may be utilized. The radiation dose should not exceed a level of about 15 megarads since the degradation rate may be increased so as to be uncontrollable by any feasible amount of stabilizer.

Figure 2:
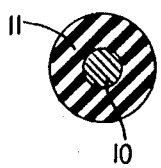
FIG. 2 is a cross-sectional view of an insulated wire in accordance with the invention.

The following examples are illustrative of insulated wire specimens prepared in accordance with the invention. In all cases, the structure was that of FIG. 2 with conductor 10 being tinned copper and with insulation layer 11 being of the indicated thickness. Examples are set forth in tabular form. For comparison purposes, all examples set forth were carried out utilizing the homopolymer and TEGDM. All amounts are in parts by weight.

TABLE

| Ingredients, parts by weight/results | Example No. | | | | | | |
|---|---|---|---|---|---|---|---|
| | 1[1] | 2 | 3 | 4 | 5 | 6 | 7 |
| PVC | 100 | 100 | 100 | 100 | 100 | 100 | 100 |
| TEGDM | | 30 | 30 | 20 | 20 | 30 | 40 |
| Triallyl phosphate | | | | | 10 | | |
| Plasticizer: | | | | | | | |
| Dioctyl phthalate | | 20 | 20 | | 20 | 20 | |
| Butyl methacrylate | | | | 15 | | | |

```
Filler:
  CaCO³_____ 15 __ __ __ __ __ __
  SiO²_____ __ 15 __ 5 __ __ __
  Clay_____
  Coated CaCO³*_____
Stabilizer:
  Basic lead sulfate_____
  Dibasic lead phthalate_____ 9  9  9  __ 9  9
Lubricant, lead stearate_____ 1  1  1  __ 1  1
Sb²O³_____ 3  __ 3  __ 3  3
Wire size, gauge_____ 24 22 24 22 24 22 22
Dose, megarads_____ 0  5  5  8  5  5.4 4
Solder heat resistance:†
  ½ lb_____ 0.6 30 10.5 __ 7.5 __ __
  1 lb_____ __ 1.5 __ 2.3 __ 5.8 50
Abrasion resistance**_____ 4  5  12 66 74 300 433
```

¹ Standard.

*Coated with fatty acid derivative for the purpose of improved dispersion.

**In accordance with the abrasion resistance test the insulated wire under test is affixed to a horizontal table. This specimen is then abraded by a rotating wheel with its plane normal to that of the long dimension of the specimen. In the particular test noted, abrading was carried out by means of a lacquered cotton covered wire member provided with a conductive surface which was attached to the periphery of the rotating wheel (and which was therefore the only member in direct contact with the specimen). The wheel was 4½ inches in diameter, was rotated at 24 r.p.m. and was loaded with a total weight of one lb. The numbers indicated in the table indicate the number of revolutions to rupture of the insulating coating as determined electrically (the test is at completion when shorting occurs between the bared wire and abrading member).

†In accordance with this test two terminals of square cross sectional configuration are spaced 3/16 inch apart horizontally. An end of wire is stripped and is held adjacent the first terminal, and an unstripped portion of the wire is passed over an adjacent terminal. The free insulated end of the wire is loaded with a ½ or 1 lb. weight and the stripped end is soldered to the first terminal. Soldering heat is applied until shorting between the two terminals is observed. The numbers indicated in the table are a measure of such time in units of seconds.

We claim:

1. Article including at least one wire provided with a coating of insulation, said insulation comprising a polymeric material consisting essentially of at least 80 percent by weight of polyvinyl chloride, characterized in that said polymeric material is irradiation cross-linked at an average energy of least 300 Kev. with a dosage sufficient to produce at least 20 percent cross-linking through a cross-linking medium at least 75 percent by weight of which medium is a difunctional monomer consisting of $CH_2C(CH_3)COO(CH_2O)_yCOC(CH_3)CH_2$ in which $y$ is an average value of 4 and in which said cross-linking medium is contained in amount of from 10 parts by weight to about 50 parts by weight based on 100 parts by weight of said polymeric material and in which said insulation contains no other additive for plasticizing the said polyvinyl chloride.

2. Method of producing an insulated wire member comprising the steps of extruding a coating about said wire, said coating comprising a polymeric material consisting essentially of at least 80 percent by weight of polyvinyl chloride, characterized in that said coating additionally contains from about 10 parts by weight to about 50 parts by weight of a cross-linking medium based on 100 parts by weight of said polymeric material and said cross-linking medium consists of at least about 75 percent by weight of a difunctional monomer consisting of $CH_2C(CH_3)COO(CH_2CH_2O)_yCOC(CH_3)CH_2$ in which $y$ is an average value of 4, and in that the resulting extruded article is subjected to an irradiation dose of from about 0.01 to about 15 megarads of an energy of at least 300 Kev. and in which said coating contains no additional polyvinyl chloride plasticizer.

* * * * *

UNITED STATES PATENT OFFICE
CERTIFICATE OF CORRECTION

Patent No. 3,623,940   Dated November 30, 1971

Inventor(s) H. M. Gladstone, and L. D. Loan

It is certified that error appears in the above-identified patent and that said Letters Patent are hereby corrected as shown below:

Col. 2, line 3, change "of" to read --or--;

line 39, change "the" to read --of--;

line 69, after "Admixed" add --cross-linking monomer may also serve to increase--.

Col. 3, line 50, after "Lubricant" insert a dash.

Col. 6, line 3, after "of" insert --at--.

Signed and sealed this 6th day of June 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,623,940    Dated November 30, 1971

Inventor(s) Harold M. Gladstone and Leonard D. Loan

It is certified that error appears in the above-identified patent and that said Letters Patent are hereby corrected as shown below:

Column 6, line 7, change the formula $$\text{"CH}_2\text{C(CH}_3\text{)COO(CH}_2\text{O)}_y\text{COC(CH}_3\text{)CH}_2\text{"} \text{ to read:}$$

$$--\text{CH}_2\text{C(CH}_3\text{)COO(CH}_2\text{CH}_2\text{O)}_y\text{COC(CH}_3\text{)CH}_2--.$$

Signed and sealed this 1st day of October 1974.

(SEAL)
Attest:

McCOY M. GIBSON JR.
Attesting Officer

C. MARSHALL DANN
Commissioner of Patents